US006672303B1

(12) United States Patent
Emter

(10) Patent No.: US 6,672,303 B1
(45) Date of Patent: Jan. 6, 2004

(54) BARBECUE GRILL

(76) Inventor: James Emter, 23401 NE. 29th Ave., Ridgefield, WA (US) 98642

( * ) Notice: Subject to any disclaimer, the term of this patent is extended or adjusted under 35 U.S.C. 154(b) by 0 days.

(21) Appl. No.: 10/251,544

(22) Filed: Sep. 19, 2002

(51) Int. Cl.$^7$ .............. F24C 1/16; F24C 3/00
(52) U.S. Cl. .......... 126/41 R; 126/9 R; 126/38
(58) Field of Search .............. 126/9 R, 25 R, 126/41 R, 40, 50, 38, 9 B

(56) References Cited

U.S. PATENT DOCUMENTS

| 2,597,477 | A | * | 5/1952 | Haislip .......... 126/9 R |
|---|---|---|---|---|
| 3,109,420 | A | * | 11/1963 | Ott .............. 126/9 R |
| 3,297,017 | A | | 1/1967 | Levin |
| 3,421,493 | A | | 1/1969 | Miller |
| 3,490,433 | A | | 1/1970 | Busenbarrick |
| 3,610,225 | A | | 10/1971 | Schwantes |
| 3,688,757 | A | | 9/1972 | Dusek |
| 3,815,571 | A | | 6/1974 | Heffelfinger |
| 3,828,759 | A | | 8/1974 | Cooper |
| 4,069,806 | A | | 1/1978 | Landry |
| 4,457,290 | A | | 7/1984 | Edwards |
| 4,508,096 | A | | 4/1985 | Slattery |
| 4,526,158 | A | | 7/1985 | Lee |
| 4,530,343 | A | | 7/1985 | Beck |
| 4,535,753 | A | * | 8/1985 | Zayauskas .......... 126/9 R |
| 4,548,192 | A | | 10/1985 | Hsu |
| 4,569,327 | A | | 2/1986 | Velten |
| 4,621,608 | A | | 11/1986 | Lee |
| 4,920,950 | A | | 5/1990 | Johnson |
| 4,971,045 | A | | 11/1990 | Probst |
| 5,103,799 | A | | 4/1992 | Anastasio |
| 5,243,961 | A | | 9/1993 | Harris |
| 5,279,214 | A | | 1/1994 | Lamendola |
| 5,333,540 | A | | 8/1994 | Mazzocchi |
| 5,575,195 | A | | 11/1996 | Foxford |
| 5,711,210 | A | | 1/1998 | Kaufman |
| 5,782,168 | A | | 7/1998 | Krhnak |
| 6,006,740 | A | | 12/1999 | Ulrickson et al. |
| 6,131,560 | A | | 10/2000 | Healy |
| 6,189,527 | B1 | | 2/2001 | Walsh et al. |
| 6,196,116 | B1 | | 3/2001 | O'Grady et al. |
| 6,205,912 | B1 | | 3/2001 | Chiu |
| 6,205,995 | B1 | | 3/2001 | Odenwald |
| 6,279,468 | B1 | | 8/2001 | Webster |
| 6,314,955 | B1 | | 11/2001 | Boetcker |
| 6,357,344 | B2 | | 3/2002 | O'Grady et al. |

* cited by examiner

Primary Examiner—James C. Yeung
(74) Attorney, Agent, or Firm—Chernoff, Vilhauer, McClung & Stenzel

(57) ABSTRACT

A selectively assembleable and disassembleable grilling device for preparing food comprises a set of substantially flat plates coupled together by a retaining assembly extending between a pair of the flat plates. The plates fit together to form an enclosure and include a pair of sidewalls, each having an aperture. A tubular member is insertable through the apertures and has retaining means at both ends thereof so as to hold the set of plates together and thereby form the enclosure.

11 Claims, 3 Drawing Sheets

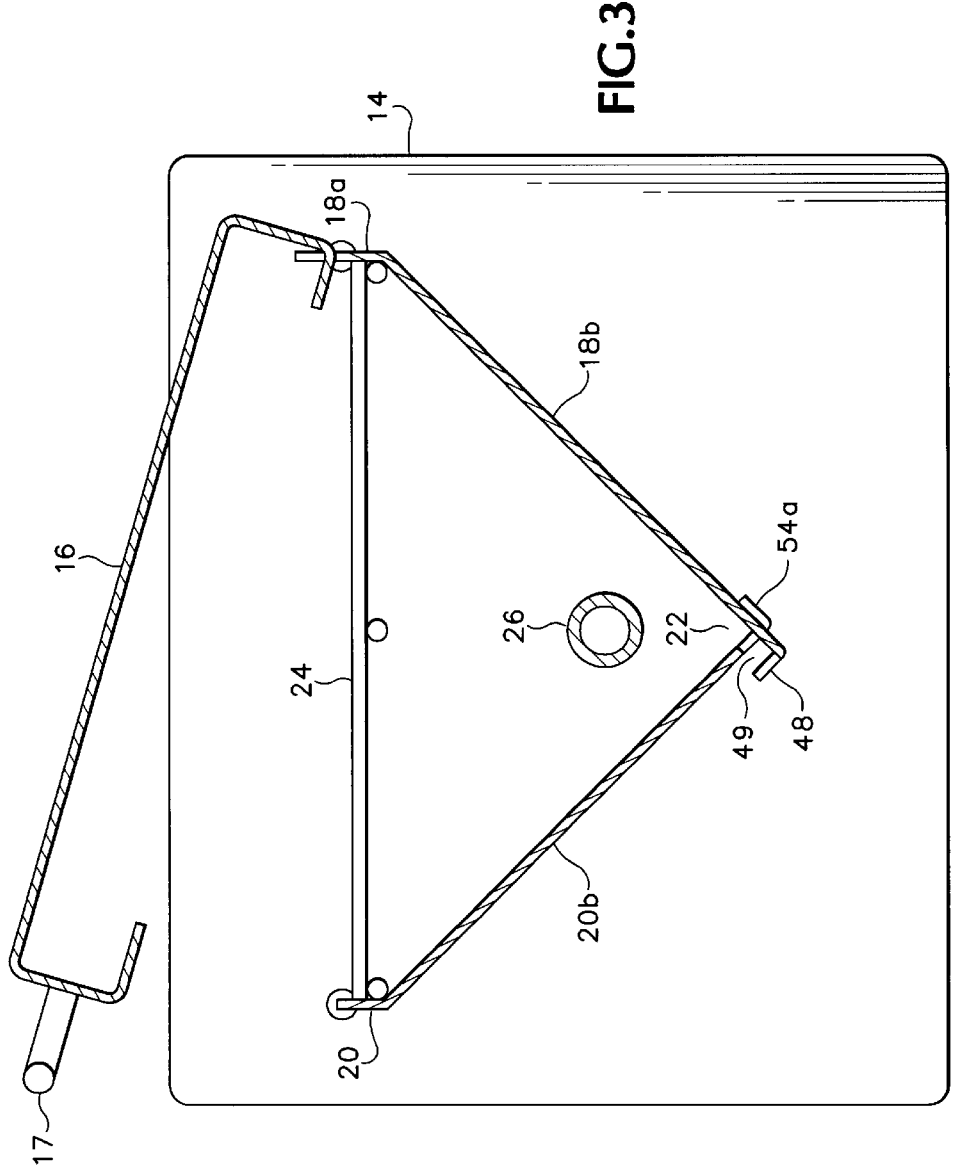

BARBECUE GRILL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The following invention relates to a collapsible and selectively assembleable and dissassembleable grilling device for preparing food.

Outdoor barbecue grills are commonly used by outdoorsmen, including hunters, fishermen and campers, to cook and prepare food. Barbecue grills are also commonly used in the home during warm weather months. Such grills exist in all sizes and shapes from small portable grilling devices to large commercial scale grills used by catering services and the like. There are two problems that have long been associated with outdoor barbecue grills. The first of these is that the barbecue grill is a large, bulky metal structure which takes up considerable space. While space is not a significant problem for home or backyard barbecue grills, it may become a significant problem for hunters, campers and fishermen who must move from place to place and who must pack cooking utensils and devices into small areas. The problem can be the same for catering services whose grills are massive and require large trucks for transport.

A second problem with such devices is that, through use and over time, barbecue grills become exceedingly greasy and dirty. There is no simple and adequate way to clean a barbecue grill. Even small grills are too large to be cleaned in a conventional kitchen sink. Moreover, because of the shape of the grill, any type of cleaning is awkward at best and is not easily accomplished.

BRIEF SUMMARY OF THE INVENTION

A grilling device for preparing food comprises a set of selectively detachable substantially flat plate members which include a pair of sidewall members, a pair of interior baffle members and a top plate member. A connecting member is slidably disposed within apertures formed oppositely in the pair of sidewall members and has retaining members situated at each end of the connecting member which thereby holds the set of plate members operatively together to form a free-standing outdoor barbecue grill.

The grill has a single set of connectors which dispenses with the need for small attaching parts such as nuts, bolts and screws and relies instead upon a single, large nut which acts as a retaining member interacting with two plate members to hold the assembly together. The barbecue grill is thus easily assembled and disassembled and the pieces that make up the assembly are substantially flat and may fit into a conventional dishwasher for cleaning.

BRIEF DESCRIPTION OF THE SEVERAL DRAWINGS

FIG. 3 is a cutaway end view taken along line 3—3 of FIG. 1.

DETAILED DESCRIPTION OF THE INVENTION

Figure 1:
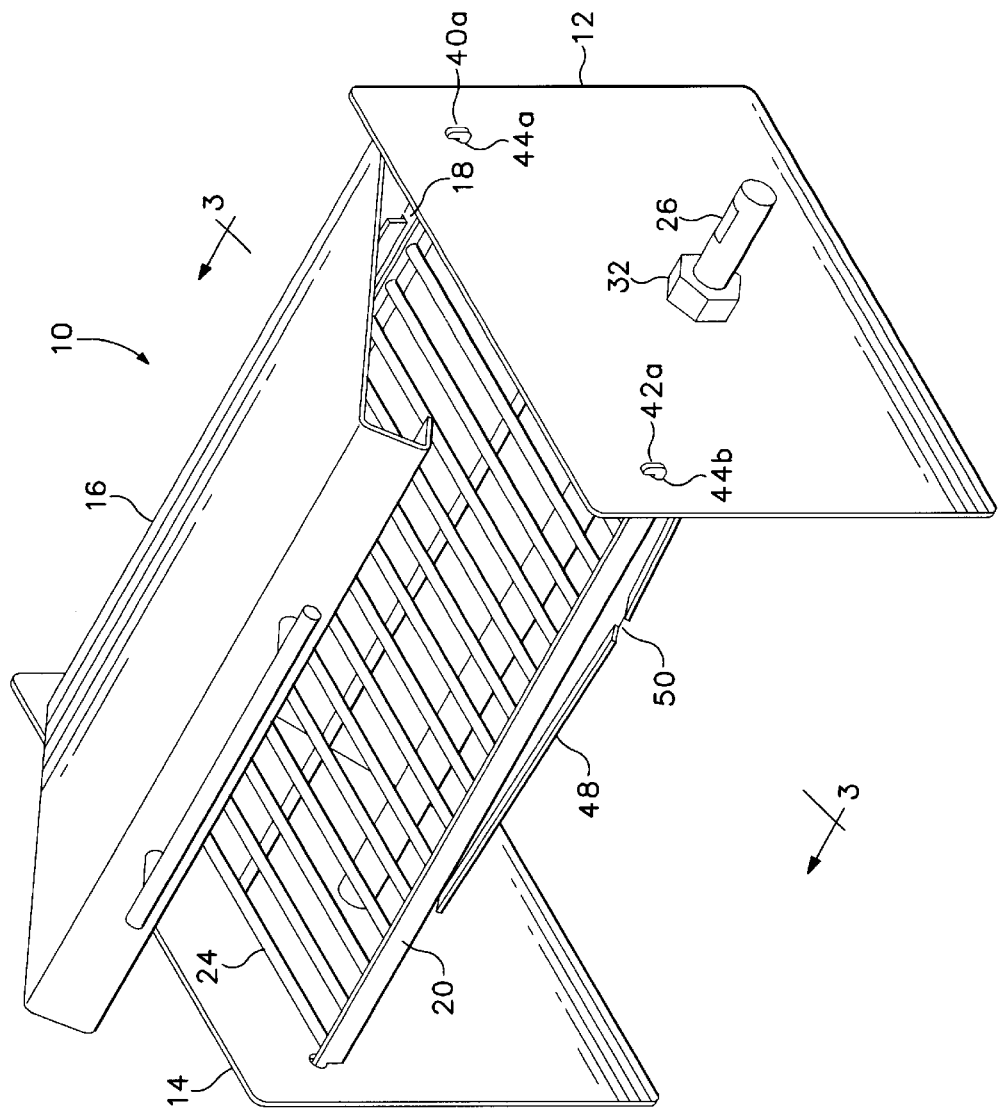
FIG. 1 is a perspective view of the fully assembled grilling device of the present invention.

Referring to FIG. 1, a selectively assembleable and disassembleable grilling device 10 includes a pair of flat sidewall plates 12 and 14 and a top cover plate 16. Interior baffle plates 18 and 20 (best shown in FIG. 2) join together to form a V-shaped trough 22 (refer to FIG. 3). A gridiron 24 is supported by the interior baffle plates which have vertical end portions 18a and 20a respectively, and angled portions 18b and 20b respectively. The geometry of the portions 18a, 18b, 20a and 20b supports the gridiron 24 in a level position.

Figure 2:
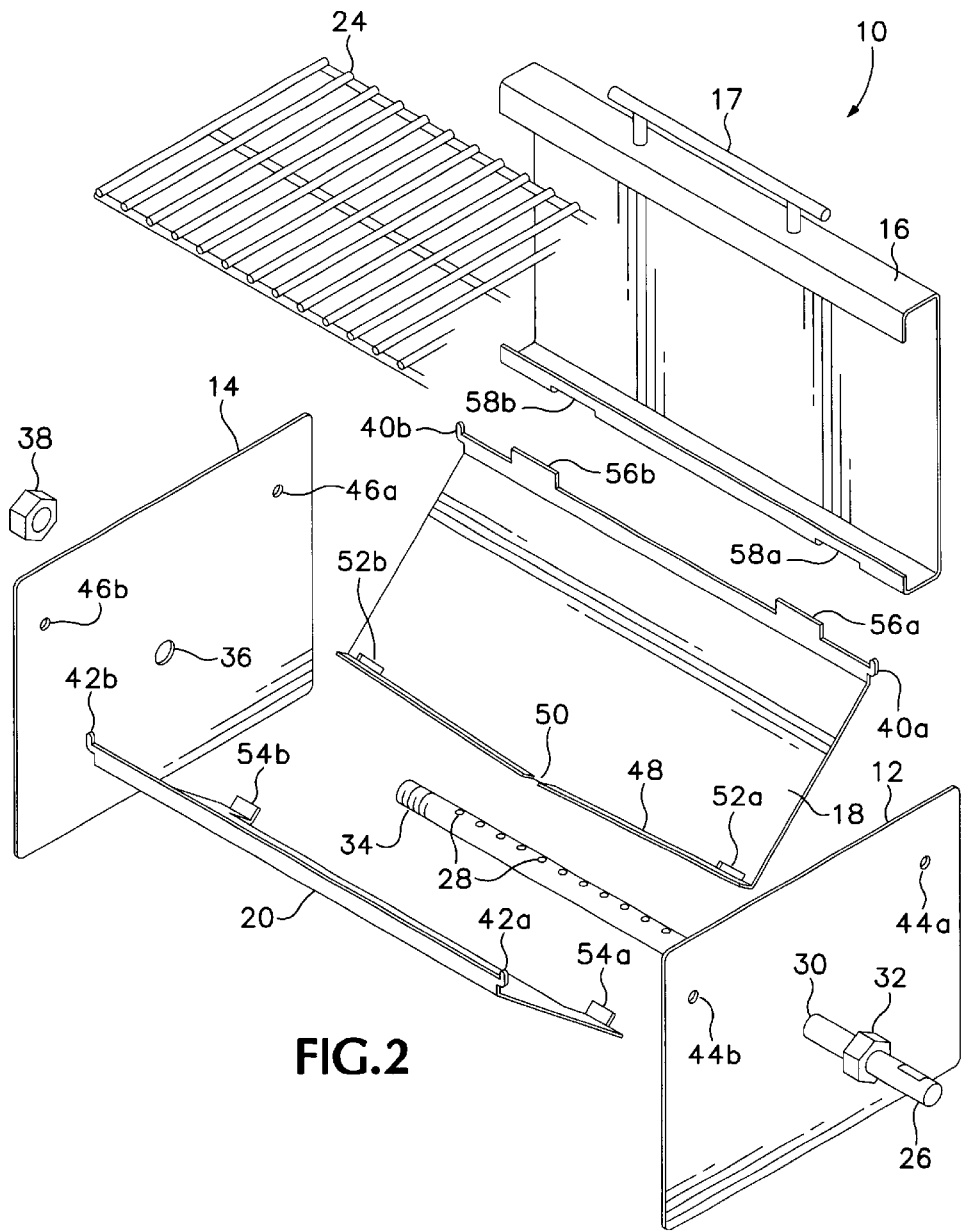
FIG. 2 is an exploded perspective view of the grilling device of FIG. 1 showing it in a disassembled state.

As shown in FIG. 2, the grilling device 10 can be disassembled and upon disassembly comprises a set of five substantially flat metal plates and a gridiron. The entire assembly is held together by a burner tube 26. The burner tube 26 is a conventional propane or butane gas burner tube which has a series of holes 28 that allow the gas to escape and upon ignition function as burner jets. The burner tube 26 is adapted to be fitted with a valve (not shown) which couples to a conventional source of gas under pressure such as a butane bottle (not shown).

The burner tube 26 is inserted through an aperture 30 in side plate 12. One end of the burner tube 26 supports a large nut 32. The other end of the burner tube 26 has threads 34. When the threaded end 34 is inserted through the aperture 36 in side plate 14, it is secured with a large nut 38 to hold the assembly together.

The interior baffle plates 18 and 20 include tabs 40a, 40b and 42a, 42b, respectively. The side plates 12 and 14 respectively include oversized holes or slots 44a and 44b on side plate 12 and 46a and 46b on side plate 14 which mate with the tabs on baffle plates 18 and 20. The holes are oversized to make it easier to join the side plates and baffle plates loosely together.

As shown best in FIGS. 2 and 3, the interior baffle plate 18 includes a lower flange 48. The flange 48 is tilted downward from each end of the interior baffle plate 18 towards a small gap 50 in the center of the plate. In addition, the interior baffle plate 18 includes a pair of slots 52a and 52b.

Interior baffle plate 20 is slightly shorter in length than baffle plate 18, and includes tabs 54a and 54b which are sized and shaped to mate with slots 52a and 52b in interior baffle plate 18.

The top portion of interior baffle plate 18 has a pair of vertically oriented tabs 56a and 56b. The top plate 16 includes a pair of corresponding slots 58a and 58b which mate with tabs 56a and 56b.

The barbecue grill of the instant invention is easily assembled and disassembled for cleaning. All of the plate members 12, 14, 16, 18 and 20 are substantially flat and in a portable version of the invention may be sized to fit conveniently within a conventional dishwasher. Thus, although the top plate member 16 has flanges at either end, these may be dimensioned to permit this piece to fit within a dishwasher as well. The flanges on the interior baffle plates 18 and 20 are likewise sized so that these members may rest in a dishwasher much like dinner plates. The grill may be made in any size, however, and even though pieces in a larger version may not fit a dishwasher, the grill when broken down is more easily transported or stored.

In order to assemble the grill between cleanings, all that is necessary is to form the interior baffle plates into a V-shape by inserting the tabs 54a and 54b into the slots 52a and 52b. Next, the tabs on interior baffle plate members 18 and 20 which comprise tabs 42a and 42b and 40a and 40b are inserted into holes 46a and 46b on end plate 14 and holes 44a and 44b on end plate 12 respectively. The assembly will then be loosely held together. The burner tube 26 is then inserted through aperture 30 in the end plate 12 until the nut 32, which acts as a retaining member, rests flush against the side wall plate 12. At the same time, the threaded portion 34 of the burner tube 26 is inserted through aperture 36 in sidewall plate 14. The nut 38 is then tightened on the threads 34 to firmly secure the assembly. Next, the top plate 16 is dropped onto the upstanding tabs 56a and 56b of interior baffle plate 18 so that these tabs are inserted into the slots 56a and 56b. Finally, the gridiron 24 is fitted between the vertical flange portions 18a and 20a. As assembled, the top plate 16 rotates freely to provide a cover as desired for the gridiron. The cover is raised and lowered by means of a conventional handle 17.

The assembly has been shown in the preferred embodiment as using the burner tube and associated nuts 32 and 38 as a retaining assembly which extends between the two sidewall members 12 and 14. In actual practice however, all that is required is an elongate rod or member that extends between the side plates 12 and 14 or between the interior baffle plates 18 and 20. This rod may exist in addition to the burner tube and may be used solely as a retaining assembly in the event that a different shape of burner tube is desired. Instead of oversized nuts, other retaining devices may be used as well. For example, the burner tube could employ a spring at the insertion end bearing against a retaining washer on the outside of the side plate and employ a clip or pin at the far end as a fastener. The assembly as used herein need have no particular form except that it is a unitary assembly extending between the two side wall plate members or between the two interior baffle plate members. More that one retaining assembly may be used if desired.

The flange 48 on interior baffle plate 18 is angled from both ends toward the center so as to form a drainage channel 49 for grease dripping below the burner tube. As shown in FIG. 3, the channel 49 is shielded from the heat of the burner tube by the interior baffle plate 20. Thus, grease that may collect in the channel 49 before draining through slot 50 will not catch fire. A grease collection pan or the like (not shown) may be placed under the slot 50 so as to collect grease for later removal.

The V-shape formed by the joinder of the interior baffle plates 18 and 20 provides an efficient interior firebox which reflects and retains heat within the enclosure and provides for the efficient cooking of food. If desired however, other shapes for the interior baffle plates, which may be curved, rounded, or polygonal, may be used without departing from the spirit of the invention.

I claim:

1. A grilling device for preparing food comprising:
   (a) a pair of substantially flat panels forming parallel side walls spaced a predetermined distance apart;
   (b) a paid of interior baffle plates defining planes perpendicular to said sidewalls and extending between said sidewalls in interlocking engagement therewith;
   (c) a gas burner tube extending between said sidewalls and parallel to said interior baffle plates; and
   (d) a selectively detachable fastening device interacting with said burner tube so as to operably hold the sidewalls and interior baffle plates together to thereby form a rigid enclosure.

2. The grilling device of claim 1 wherein said interior baffle plates define planes that intersect to form a V-shaped trough.

3. The grilling device of claim 2 wherein said burner tube is situated near a lower portion of said V-shaped trough.

4. The grilling device of claim 1 or 2 wherein said burner tube includes a stop member at a first end bearing against a first sidewall and a second threaded end extending through the other of said sidewall plates and wherein said fastening device is a threaded member matingly attached to said threaded end of said burner tube.

5. The grilling device of claim 1 further including a top plate matingly interacting with one of said interior baffle plates to form a selectively closing cover.

6. The grilling device of claim 5 further including a gridiron sized and shaped to lie in nesting relation between said interior baffle plates and above said burner tube.

7. A grilling device for cooking comprising:
   (a) a pair of substantially flat panels forming parallel sidewalls spaced a predetermined distance apart;
   (b) a pair of substantially flat interior baffle plates defining planes perpendicular to said sidewalls and extending between said sidewalls in interlocking engagement therewith so as to form an upwardly expanding V-shaped trough; and
   (c) an elongate connecting member extending between said pair of sidewalls and parallel to said V-shaped trough, said member having a selectively attachable and detachable fastener for holding said sidewalls and said interior baffle plates together.

8. The grilling device of claim 7 wherein said V-shaped trough includes a drainage channel.

9. The grilling device of claim 8 wherein the drainage channel is shielded by an overlapping region of one of the interior baffle plates.

10. The grilling device of claim 7 wherein the interior baffle plates includes tabs that fit loosely into apertures formed on each of the sidewalls.

11. The grilling device of any of claims 7 through 10 wherein the elongate connecting member is a gas burner tube.

\* \* \* \* \*

UNITED STATES PATENT AND TRADEMARK OFFICE
CERTIFICATE OF CORRECTION

PATENT NO. : 6,672,303 B1  Page 1 of 1
APPLICATION NO. : 10/251544
DATED : January 6, 2004
INVENTOR(S) : Emter It is certified that error appears in the above-identified patent and that said Letters Patent is hereby corrected as shown below:

Column 3, line 39, the phrase "more that one" should be changed to -- more than one --

Column 4, line 6, the phrase "a paid" should be changed to -- a pair --

Signed and Sealed this

First Day of July, 2008

JON W. DUDAS
*Director of the United States Patent and Trademark Office*